US012380579B2

(12) United States Patent
Fang et al.

(10) Patent No.: US 12,380,579 B2
(45) Date of Patent: Aug. 5, 2025

(54) INTELLIGENT UNDERSTANDING SYSTEM FOR REAL-TIME RECONSTRUCTION OF LARGE-SCALE SCENE LIGHT FIELD

(71) Applicants: TSINGHUA UNIVERSITY, Beijing (CN); GUANGDONG OPPO MOBILE TELECOMMUNICATIONS CORP., LTD., Guangdong (CN)

(72) Inventors: Lu Fang, Beijing (CN); Leyao Liu, Beijing (CN); Tian Zheng, Beijing (CN); Ping Liu, Guangdong (CN)

(73) Assignees: TSINGHUA UNIVERSITY, Beijing (CN); GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 528 days.

(21) Appl. No.: 17/817,483

(22) Filed: Aug. 4, 2022

(65) Prior Publication Data
US 2023/0334682 A1 Oct. 19, 2023

(30) Foreign Application Priority Data
Apr. 14, 2022 (CN) .......................... 202210389229.3

(51) Int. Cl.
*G06T 7/521* (2017.01)
*G06T 7/11* (2017.01)
*G06V 10/74* (2022.01)

(52) U.S. Cl.
CPC ................ *G06T 7/521* (2017.01); *G06T 7/11* (2017.01); *G06V 10/761* (2022.01)

(58) Field of Classification Search
CPC . G06T 7/521; G06T 7/11; G06T 2207/20084; G06T 17/00; G06T 19/20;
(Continued)

(56) References Cited

U.S. PATENT DOCUMENTS 10,984,290 B1 * 4/2021 Goel ...................... G06T 7/251

FOREIGN PATENT DOCUMENTS

| CN | 110827295 A | * | 2/2020 | ........... G06F 18/253 |
| CN | 111311611 A | * | 6/2020 | ........... G06N 3/0454 |

OTHER PUBLICATIONS

De Brabandere, Bert, Davy Neven, and Luc Van Gool. "Semantic instance segmentation with a discriminative loss function." arXiv preprint arXiv: 1708.02551 (2017) https://arxiv.org/abs/1708.02551 (Year: 2017).*

(Continued)

*Primary Examiner* — Matthew C Bella
*Assistant Examiner* — Andrew B. Jones
(74) *Attorney, Agent, or Firm* — Hodgson Russ LLP

(57) ABSTRACT

An intelligent understanding apparatus for real-time reconstruction of a large-scale scene light field includes the following. A data obtaining module obtains a 3D instance depth map, and obtain 3D voxels and voxel color information through simultaneous positioning and map generation. The model constructing module constructs and trains a real-time light field reconstruction network model using a ScanNet dataset. The real-time light field reconstruction network model extracts features of the 3D voxels and voxel color information, and obtain a semantic segmentation result and an instance segmentation result. The semantic segmentation module inputs the 3D voxel and voxel color information corresponding to the 3D instance depth map into the trained real-time light field reconstruction network model, and determine an output as a semantic segmentation result and an instance segmentation result corresponding to the 3D instance depth map.

11 Claims, 5 Drawing Sheets

(58) Field of Classification Search
CPC .... G06V 10/761; G06V 10/764; G06V 10/82; G06F 18/23
See application file for complete search history.

(56) References Cited

OTHER PUBLICATIONS

CNIPA, First Office Action for CN Application No. 202210389229.3, May 20, 2022.

* cited by examiner

INTELLIGENT UNDERSTANDING SYSTEM FOR REAL-TIME RECONSTRUCTION OF LARGE-SCALE SCENE LIGHT FIELD

CROSS REFERENCE TO RELATED APPLICATIONS

This application claims priority to Chinese Application No. 202210389229.3, filed on Apr. 14, 2022, the entire disclosure of which is incorporated herein by reference.

TECHNICAL FIELD

The disclosure relates to a field of deep learning technologies, and in particular, to an intelligent understanding system and apparatus for real-time reconstruction of a large-scale scene light field.

BACKGROUND

Real-time reconstruction and intelligent understanding of the large-scale scene light field are core technical problems in the fields of artificial intelligence, machine vision, and unmanned systems. Technologies such as robot navigation, augmented reality (AR), and virtual reality (VR) all need the real-time reconstruction and intelligent understanding of the large-scale scene light fields. The real-time reconstruction and intelligent understanding of the large-scale scene light fields refers to scanning the scene with a portable device, constructing a model of the scene in real time using the three-dimensional (3D) light field reconstruction technology along with generating semantic and instance segmentation information of the model through the online 3D semantic and instance segmentation technology.

SUMMARY

According to a first aspect, an intelligent understanding apparatus for real-time reconstruction of a large-scale scene light field is provided. The apparatus includes a processor configured to:
  obtain a three-dimensional (3D) instance depth map, and obtain 3D voxels and voxel color information of the 3D instance depth map through simultaneous positioning and map generation;
  construct a real-time light field reconstruction network model, and train the real-time light field reconstruction network model using a ScanNet dataset, in which the real-time light field reconstruction network model is configured to extract features of the 3D voxels and voxel color information of the 3D instance depth map, and obtain a semantic segmentation result and an instance segmentation result of the depth map by performing the semantic segmentation and the instance segmentation; and
  input the 3D voxel and voxel color information corresponding to the 3D instance depth map into the trained real-time light field reconstruction network model, and determine an output as a semantic segmentation result and an instance segmentation result corresponding to the 3D instance depth map.

According to a second aspect, an intelligent understanding system for real-time reconstruction of a large-scale scene light field is provided. The intelligent understanding system includes an intelligent understanding apparatus as described above and a memory for storing a computer program executable by the intelligent understanding apparatus.

According to a third aspect, an intelligent understanding for real-time reconstruction of a large-scale scene light field is provided. The method includes:
  obtaining a three-dimensional (3D) instance depth map, and obtaining 3D voxels and voxel color information of the 3D instance depth map through simultaneous positioning and map generation;
  constructing a real-time light field reconstruction network model, and training the real-time light field reconstruction network model using a ScanNet dataset, in which the real-time light field reconstruction network model is configured to extract features of the 3D voxels and voxel color information of the 3D instance depth map, and obtain a semantic segmentation result and an instance segmentation result of the depth map by performing the semantic segmentation and the instance segmentation; and
  inputting the 3D voxel and voxel color information corresponding to the 3D instance depth map into the trained real-time light field reconstruction network model, and determining an output as a semantic segmentation result and an instance segmentation result corresponding to the 3D instance depth map.

BRIEF DESCRIPTION OF THE DRAWINGS

The above and/or additional aspects and advantages of the disclosure will become apparent and readily understood from the following description of embodiments taken in conjunction with the accompanying drawings.

DETAILED DESCRIPTION

Figure 1:
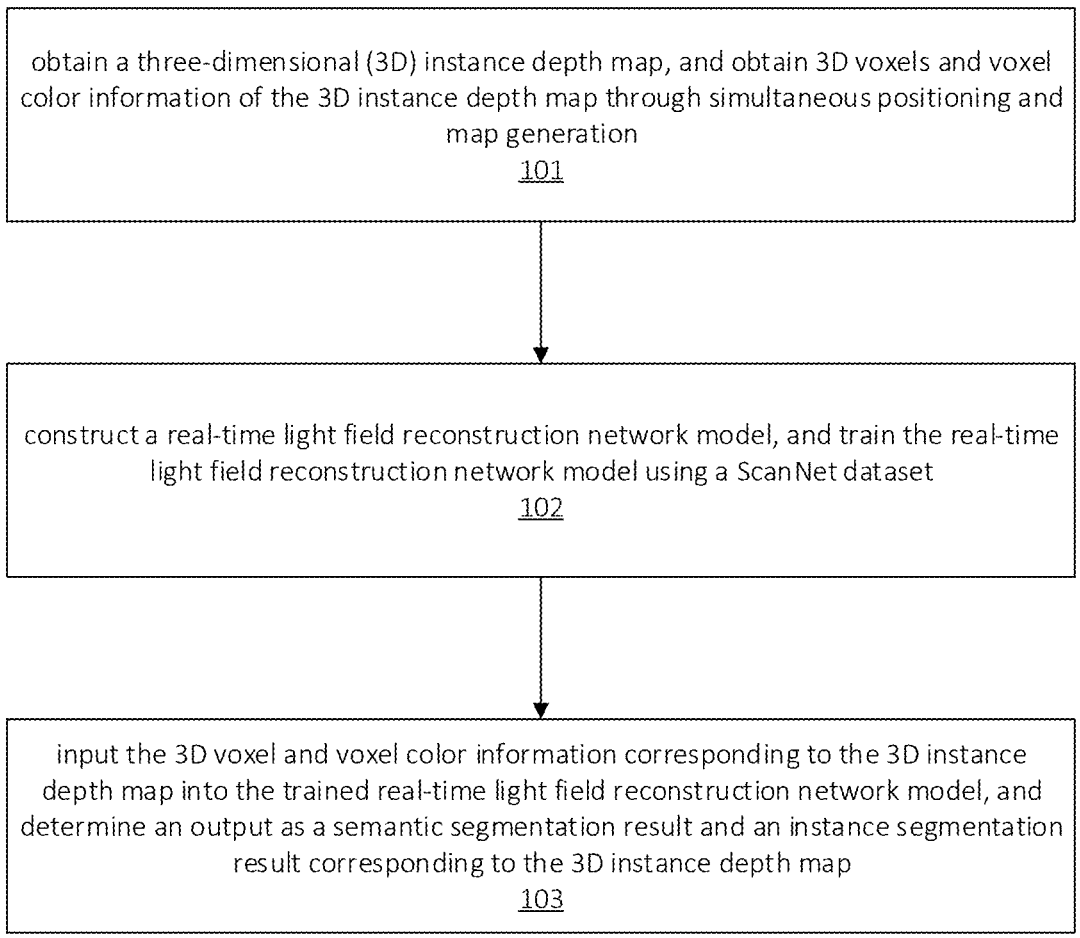
FIG. 1 is a flowchart illustrating an intelligent understanding method for real-time reconstruction of a large-scale scene light field according to embodiments of the disclosure.

Embodiments of the disclosure are described in detail below, examples of which are illustrated in the accompanying drawings, in which the same or similar reference numerals throughout the disclosure refer to the same or similar elements or elements having the same or similar functions. Embodiments described below with reference to the accompanying drawings are examples, intended to explain the disclosure, and should not be construed as limiting the disclosure.

Most of existing high-precision 3D semantic and instance segmentation methods are offline that obtain the instance segmentation information after the reconstructed model has been obtained. Recent high-precision offline segmentation algorithms use sparse convolutional networks, which has a slow speed due to the large network and taking all points as input. Therefore, these algorithms are not suitable for online scenarios. In addition, the instance segmentation also needs a clustering post-processing, and thus it is time consuming when there are a large amount of points.

For the task of online 3D segmentation, a common solution is the 2D-to-3D approach, which means to perform 2D convolutions on RGBD frames, followed by projecting the 2D predictions to 3D space and fusing with the previous results via a probabilistic model. These methods utilize 2D information merely leading to low segmentation accuracy. Although recent methods achieve improvements by using 3D point convolution to process 2D features, the problem remains unsolved, because neither 2D features nor local 3D convolutions are aware of the global information of the 3D scene. As a result, they still suffer from the low accuracy.

Now, there are two methods to achieve highly accurate 3D semantic instance segmentation while enabling online inference along with 3D reconstruction, one is the combination of the 2D segmentation convolutional neural network with a 3D reconstruction system, and the other one is using sparse convolution to input all the currently reconstructed points. For the former, due to the limitation of 2D semantics in understanding 3D space, the accuracy of the method based on 2D segmentation is relatively low. For the latter, due to the large network and the large amount of inputs, the speed is not high enough to be used in real-time systems.

Therefore, an intelligent understanding method, apparatus, and system for real-time reconstruction of a large-scale scene light field are provided according to embodiments of the disclosure, which will be described with reference to the accompanying drawings.

FIG. 1 is a flowchart illustrating an intelligent understanding method for real-time reconstruction of a large-scale scene light field according to embodiments of the disclosure. As illustrated in FIG. 1, the method includes the following.

At block 101, a depth map of a three-dimensional (3D) instance is obtained, and 3d voxels and voxel color information of the depth map are obtained through simultaneous positioning and map generation.

In the instance and semantic segmentation applications, the offline 3D segmentation method and the online 3D segmentation method can be used.

The 3D scene semantic and instance segmentation are widely studied topics in computer vision. For the semantic segmentation tasks, most recent deep learning based methods fall into two types according to convolution type: point-based methods and voxel-based methods. The disclosure focuses on the voxel-based methods.

The voxel-based methods take voxelized point cloud as input and then apply 3D convolution on the voxel grid. Earlier work adopt dense 3D convolutions. However, due to the high computation cost for high dimensional data, the large-scale voxel grids cannot be handled. The critical limitation is later solved by the emergence of sparse convolution, which exploits the inherent sparsity of the 3D point cloud, demonstrating state-of-the-art segmentation accuracy.

For the instance segmentation, sparse convolutional networks are also widely used. A "learning-then-clustering" approach has been proposed to perform meanshift clustering based on per-point features extracted using the sparse convolutional network.

Online scene segmentation has wide applications in AR/VR and robotics. The task is to predict semantic or instance labels along with 3D reconstruction system in real time. Early works tackle this problem using the 2D-3D approach, which means to predict 2D semantic probabilities for each RGBD frame using 2D CNN and then project back to 3D space, followed by a probabilistic fusion step. In addition, early works tackle this problem by performing instance segmentation in 2D and then fusing the results to 3D to achieve online panoptic segmentation. Furthermore, early works tackle this problem by performing 3D point convolution on local neighborhoods to fuse 2D features, achieving accuracy improvement. However, they can only process very few points in order to maintain online speed. Moreover, early works tackle this problem by performing 3D point convolution on super-voxels to fuse 2D features, which improves the speed and achieves leading online semantic segmentation accuracy. However, these methods highly rely on 2D features and fail to capture global 3D information, resulting in a gap between offline and online methods. Recently, an incremental sparse convolution has been proposed to use 3D sparse convolution online to reduce the accuracy between offline and online methods. However, it is still unable to perform instance segmentation online.

The 3D instance depth map is obtained by an image sensor. For example, the image sensor is a red-green-blue-depth (RGB-D) sensor, a binocular depth sensor, a structured light sensor, and a time of flight (ToF) sensor.

At block 102, a real-time light field reconstruction network model is constructed and is trained with ScanNet dataset. The real-time light field reconstruction network model is configured to extract features of the 3D voxels and voxel color information of the 3D instance depth map, and obtain a semantic segmentation result and an instance segmentation result of the depth map by performing the semantic segmentation and the instance segmentation.

Figure 2:
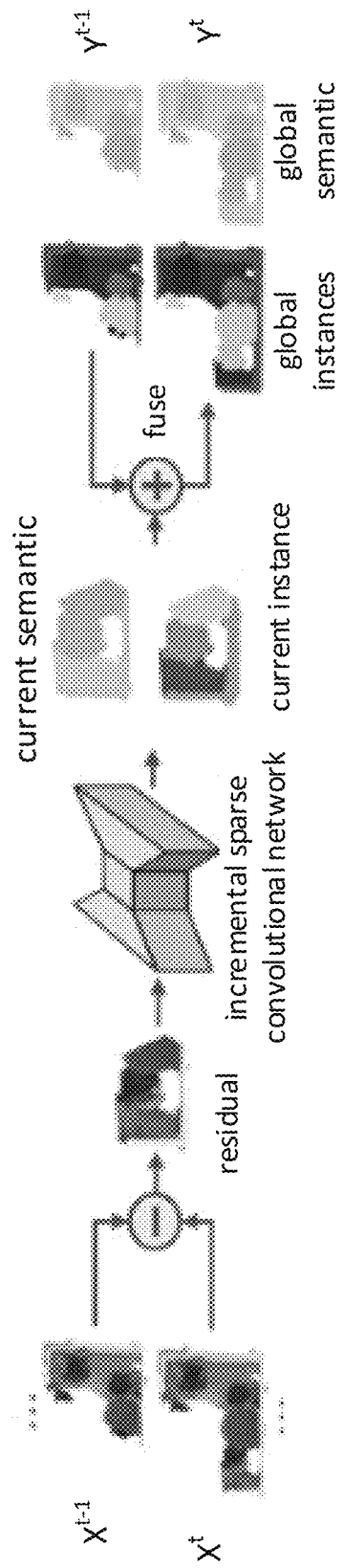
FIG. 2 is a schematic diagram illustrating a structure of a real-time light field reconstruction network model used in an intelligent understanding method for real-time reconstruction of a large-scale scene light field according to embodiments of the disclosure.

The pipeline of the real-time light field reconstruction network model is illustrated as FIG. 2. The real-time light field reconstruction network model includes a sparse convolutional network module and an online segmentation module. For example, the online segmentation module is an online segmentation circuit.

Figure 3:
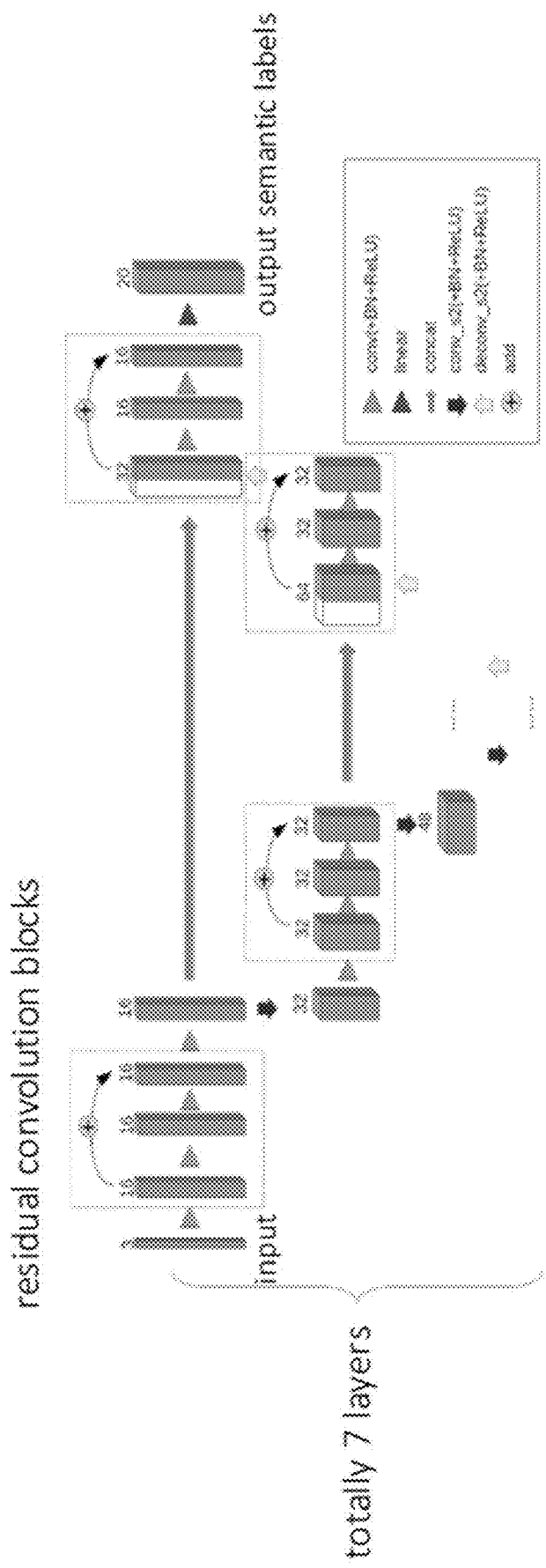
FIG. 3 is a schematic diagram illustrating a convolutional neural network of a sparse convolutional network model used in an intelligent understanding method for real-time reconstruction of a large-scale scene light field according to embodiments of the disclosure.

The sparse convolutional network module is a UNet-like sparse convolutional network which adopts the convolutional neural network structure illustrated as FIG. 3. The sparse convolutional network module is configured to, for each input point, e.g., for each voxel, output a semantic probability and an instance embedding.

The online segmentation module is configured to update the semantic category according to the semantic probability output by the sparse convolutional network module, and at the same time, for each frame, obtain an instance result of a current depth map of the frame by clustering the instance embeddings obtained from the current depth map, and fuse current instance results into a global instance result.

The sparse convolutional network module is configured to set a cross entropy loss function to train the semantic probabilities, and set a discriminative loss function to train the instance embeddings.

The sparse convolutional network module is configured to set a temporal consistency loss function that constrains distances of an instance of a 3D instance depth map at different times to be same or near the embeddings of the instance of the same 3D instance depth map at different times.

The online segmentation module is further configured to perform the following.

For the semantic segmentation, the semantic category of a current point is updated using the semantic probability. The semantic segmentation can be performed by adopting existing segmentation method by an existing segmentation network. The semantic segmentation is to segment along the boundaries between the object categories in the 3D instance depth map, while the instance segmentation is to segment different objects in the 3D instance depth map.

For the instance segmentation, the instance embeddings obtained from the 3D instance depth map are clustered. The current instance refers to an object contained in the image within a current field of view of the sensor that is configured to obtain the 3D instance depth map. The global instances refer to objects contained in the entirety of the 3D instance depth map.

Similarities between the current instance and the global instances are obtained. A mean embedding is obtained for the current instance by averaging the embeddings, and the similarity comparison is performed between the mean embedding and respective mean embedding of each global instance one by one.

The temporal consistency loss function is set to constrain distances of an instance of a 3D instance depth map at different times to be same or near the embeddings of the instance of the same 3D instance depth map at different times.

In obtaining the similarities between the current instance and the global instances, the spatial overlap ratio of the current instance is obtained. The similarities between the current instance and the global instances equal to the product of the similarities between the embedding of the current instance and embeddings of the global instances and the spatial overlap ratio of the current instance. The spatial overlap ratio information is a ratio of the number of points of the current instance that overlap with each global instance to the number of points of the current instance. For the current instance, the maximum similarity of the current instance and a corresponding global instance is obtained. If the maximum similarity is less than a threshold, it is assigned a new instance label.

The similarities between the embedding of the current instance and the embedding of the global instance is represented by an included angle of these embeddings.

At block 103, the 3D voxel and voxel color information corresponding to the 3D instance depth map are input into the trained real-time light field reconstruction network model, and the output of the model is determined as the semantic segmentation result and instance segmentation result corresponding to the 3D instance depth map.

The high-precision instance segmentation labels can be generated under the ScanNet dataset. The model prediction speed is 10 to 15 Hz, reaching the real-time level. In detail, for the instance segmentation, according to ScanNet evaluation criteria or the mAP@50 metric valuation criteria, a score of 65.7 on mAP@50 is achieved, largely outperforming other online segmentation algorithms by a large margin. With the same evaluation method as other online algorithms, the computation speed is evaluated on scene0645_01, a representative large-scale scene in ScanNet, the predicted speed is 10 to 15 Hz.

Figure 5:
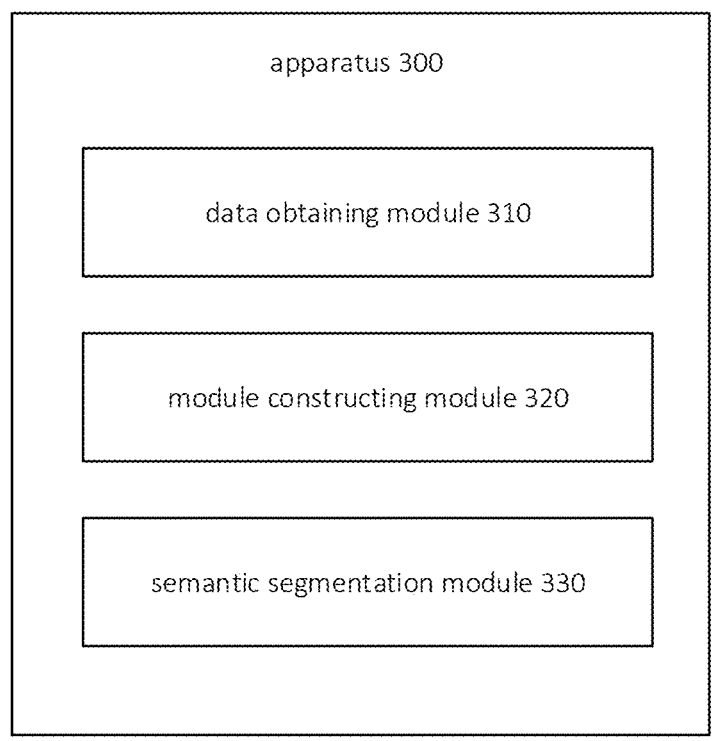
FIG. 5 is a schematic diagram illustrating an intelligent understanding apparatus for real-time reconstruction of a large-scale scene light field according to embodiments of the disclosure.

FIG. 5 is a schematic diagram illustrating an intelligent understanding apparatus for real-time reconstruction of a large-scale scene light field according to embodiments of the disclosure. The apparatus includes a data obtaining module 310, a model constructing module 320, and a semantic segmentation module 330.

The data obtaining module 310 is configured to obtain a 3D instance depth map, and obtain 3D voxels and voxel color information of the 3D instance depth map through simultaneous positioning and map generation;

The model constructing module 320 is configured to construct a real-time light field reconstruction network model, and train the real-time light field reconstruction network model using a ScanNet dataset. The real-time light field reconstruction network model is configured to extract features of the 3D voxels and voxel color information of the 3D instance depth map, and obtain a semantic segmentation result and an instance segmentation result of the depth map by performing the semantic segmentation and the instance segmentation.

The semantic segmentation module 330 is configured to input the 3D voxel and voxel color information corresponding to the 3D instance depth map into the trained real-time light field reconstruction network model, and determine the output of the model as the semantic segmentation result and instance segmentation result corresponding to the 3D instance depth map.

The data obtaining module 310 is further configured to obtain the depth map through an image sensor. The image sensor is an RGB-D depth sensor, a binocular depth sensor, a structured light sensor, or a time of flight (ToF) sensor.

The pipeline of the real-time light field reconstruction network model is illustrated as FIG. 2. The real-time light field reconstruction network model includes a sparse convolutional network module and an online segmentation module.

The sparse convolutional network module is a UNet-like sparse convolutional network which adopts the convolutional neural network structure illustrated as FIG. 3. The sparse convolutional network module is configured to, for each input point, e.g., for each voxel, output a semantic probability and an instance embedding.

The online segmentation module is configured to update the semantic category according to the semantic probability output by the sparse convolutional network module, and at the same time, for each frame, obtain an instance result of a current depth map of the frame by clustering the instance embeddings obtained from the current depth map, and fuse current instance results into a global instance result.

The sparse convolutional network module is configured to set a cross entropy loss function and a discriminative loss function. The cross entropy loss function is configured to train the semantic probabilities. The discriminative loss function is configured to train the instance embeddings.

The sparse convolutional network module is configured to set a temporal consistency loss function. The temporal consistency loss function is configured to constrain distances of an instance of a 3D instance depth map at different times to be same or near the embeddings of the instance of the same 3D instance depth map at different times.

The online segmentation module is further configured to perform the following.

For the semantic segmentation, the semantic category of a current point is updated using the semantic probability. The semantic segmentation can be performed by adopting existing segmentation method by an existing segmentation network.

For the instance segmentation, the instance embeddings obtained from the 3D instance depth map are clustered.

Similarities between the current instance and the global instances are obtained. A mean embedding is obtained for the current instance by averaging the embeddings, and the similarity comparison is performed between the mean embedding and respective mean embedding of each global instance one by one.

The temporal consistency loss function set by the sparse convolutional network module is configured to constrain distances of an instance of a 3D instance depth map at different times to be same or near the embeddings of the instance of the same 3D instance depth map at different times, such that the current instance and the global instances can be fused smoothly.

In obtaining the similarities between the current instance and the global instances, the spatial overlap ratio of the current instance is obtained. The similarities between the current instance and the global instances equal to the product of the similarities between the embedding of the current instance and embeddings of the global instances and the spatial overlap ratio of the current instance. The spatial overlap ratio information is a ratio of the number of points of the current instance that overlap with each global instance to the number of points of the current instance.

For the current instance, the maximum similarity of the current instance and a corresponding global instance is obtained. If the maximum similarity is less than a threshold, it is assigned a new instance label.

In the disclosure, the ScanNet dataset is used to train and test the real-time light field reconstruction network model.

In detail, the ScanNet dataset is preprocessed to obtain effective 3D instance depth maps. The effective 3D instance depth maps are divided into a training set and a test set according to a preset proportion.

The existing SLAM system can be used to reconstruct a current 3D geometric model using the effective 3D instance depth maps as the training set, to obtain the 3D voxel and voxel color information of the corresponding 3D instance depth map. Each of the training set and the test set includes the semantic segmentation result and the instance segment result of the 3D instance depth map.

The 3D voxel and voxel color information of the 3D instance depth map of the training set are input into the real-time light field reconstruction network model, by constantly adjusting the loss functions of the sparse convolutional network modules, when a consistency ratio between the results output by the real-time light field reconstruction network model and the segmentation results contained in the dataset is higher than a preset threshold, it is determined that the model training is complete. After the model training is completed, the real-time 3D instance depth map can be processed to obtain its corresponding semantic segmentation result and instance segmentation result.

Figure 4:
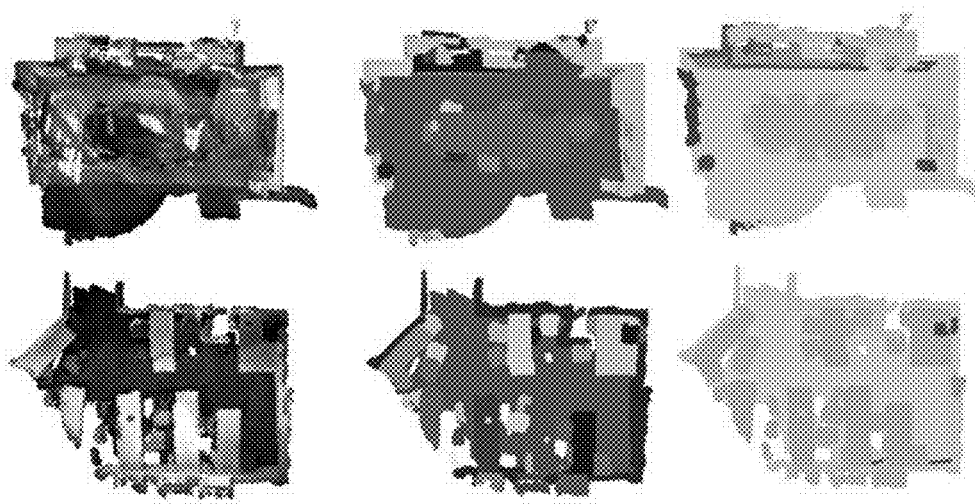
FIG. 4 is a schematic diagram illustrating an instance and semantic segmentation effect of an intelligent understanding method for real-time reconstruction of a large-scale scene light field according to embodiments of the disclosure.

The speed test of a standard large-scale scene shows that the segmentation labels can be updated in real time, and the segmentation rate is 10 to 15 Hz. The segmentation and reconstruction results are illustrated in FIG. 4. The left side of each row is the reconstructed geometric model, and the right side is the corresponding generated instance and semantic model. The solution can run on a portable device in real time. The apparatus according to the disclosure can be Surface Book and Xtion depth camera.

In order to realize the above embodiments, an intelligent understanding system for real-time reconstruction of a large-scale scene light field is provided. The system includes an intelligent understanding apparatus for real-time reconstruction of a large-scale scene light field according to embodiments of the disclosure. The system further includes a memory and a computer program stored on the memory and executable by an intelligent understanding apparatus for real-time reconstruction of a large-scale scene light field.

Figure 6:
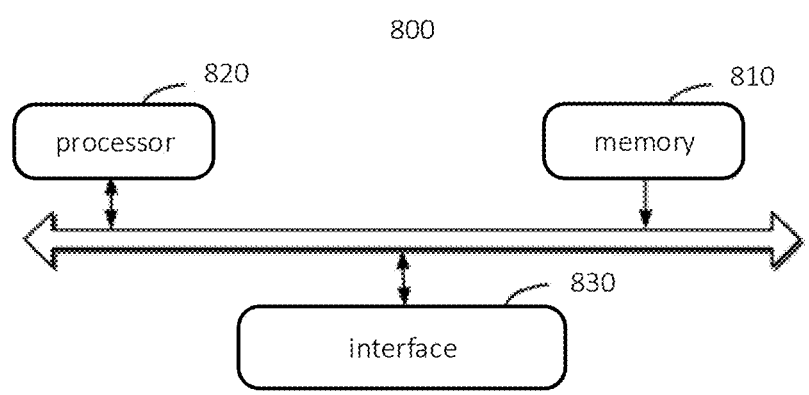
FIG. 6 is a schematic diagram illustrating an intelligent understanding system for real-time reconstruction of a large-scale scene light field according to embodiments of the disclosure.

As illustrated in FIG. 6, the intelligent understanding system for real-time reconstruction of a large-scale scene light field includes an instruction memory 810 and an interface 830. The instruction can be executed by the intelligent understanding apparatus 820 for real-time reconstruction of a large-scene light field. Alternatively, the storage medium is a non-transitory computer-readable storage medium. The non-transitory computer-readable storage medium may be ROM, random access memory (RAM), CD-ROM, magnetic tape, floppy disk, and optical data storage device, etc.

Embodiments of the disclosure further provide an intelligent understanding method for real-time reconstruction of a large-scale scene light field. The method includes obtaining a three-dimensional (3D) instance depth map, and obtaining 3D voxels and voxel color information of the 3D instance depth map through simultaneous positioning and map generation; constructing a real-time light field reconstruction network model, and training the real-time light field reconstruction network model using a ScanNet dataset, in which the real-time light field reconstruction network model is configured to extract features of the 3D voxels and voxel color information of the 3D instance depth map, and obtain a semantic segmentation result and an instance segmentation result of the depth map by performing the semantic segmentation and the instance segmentation; and inputting the 3D voxel and voxel color information corresponding to the 3D instance depth map into the trained real-time light field reconstruction network model, and determining an output as a semantic segmentation result and an instance segmentation result corresponding to the 3D instance depth map.

In the description of this specification, description with reference to the terms "one embodiment," "some embodiments," "example," "specific example," or "some examples", etc., mean specific features described in connection with the embodiment or example, structure, material or feature is included in at least one embodiment or example of the disclosure. In this specification, schematic representations of the above terms are not necessarily directed to the same embodiment or example. Furthermore, the particular features, structures, materials or characteristics described may be combined in any suitable manner in any one or more embodiments or examples. Furthermore, those skilled in the art may combine different embodiments or examples described in this specification, as well as the features of the different embodiments or examples, without conflicting each other.

In addition, the terms "first" and "second" are only used for descriptive purposes, and should not be construed as indicating or implying relative importance or implying the number of indicated technical features. Thus, a feature delimited with "first", "second" may expressly or implicitly include at least one of that feature. In the description of the disclosure, "plurality" means at least two, such as two, three, etc., unless otherwise expressly and specifically defined.

Any process or method description in the flowcharts or otherwise described herein may be understood to represent a module, segment or portion of code including one or more executable instructions for implementing custom logical functions or steps of the process. The scope of the preferred embodiments of the disclosure includes alternative implementations in which the functions may be performed out of the order shown or discussed, including performing the functions substantially concurrently or in the reverse order depending upon the functions involved, which should be understood by those skilled in the art to which the embodiments of the disclosure belong.

The logic and/or steps represented in flowcharts or otherwise described herein, for example, may be considered an ordered listing of executable instructions for implementing the logical functions, may be embodied in any computer-readable medium, for use with, or in conjunction with, an instruction execution system, apparatus, or device (such as a computer-based system, a system including a processor, or other system that can fetch instructions from and execute instructions from an instruction execution system, apparatus, or apparatus) or equipment. For the purposes of this specification, a "computer-readable medium" can be any device that can contain, store, communicate, propagate, or transport the program for use by or in connection with an instruction execution system, apparatus, or device. More specific examples (non-exhaustive list) of computer readable media include the following: electrical connections with one or more wiring (electronic devices), portable computer disk cartridges (magnetic devices), random access memory (RAM), Read Only Memory (ROM), Erasable Editable Read Only Memory (EPROM or Flash Memory), Fiber Optic devices, and Portable Compact Disc Read Only Memory (CDROM). In addition, the computer readable medium may even be paper or other suitable medium on which the program may be printed, as the paper or other medium may be optically scanned, for example, followed by editing, interpretation, or other suitable medium as necessary process to obtain the program electronically and then store it in computer memory.

It should be understood that various parts of the disclosure may be implemented in hardware, software, firmware or a combination thereof. In the above-described embodiments, various steps or methods may be implemented in software or firmware stored in memory and executed by a suitable instruction execution system. For example, if implemented in hardware as in another embodiment, it can be implemented by any one of the following techniques known in the art, or a combination thereof: discrete with logic gates for implementing logic functions on data signals Logic circuits, ASICs with suitable combinational logic gates, Programmable Gate Arrays (PGA), Field Programmable Gate Arrays (FPGA), etc.

Those of ordinary skill in the art can understand that all or part of the steps carried by the methods of the above embodiments can be completed by instructing the relevant hardware through a program, and the program can be stored in a computer-readable storage medium, and the program is stored in a computer-readable storage medium. When executed, one or a combination of the steps of the method embodiment is included.

In addition, each functional unit in each embodiment of the disclosure may be integrated into one processing module, or each unit may exist physically alone, or two or more units may be integrated into one module. The above-mentioned integrated modules can be implemented in the form of hardware, and can also be implemented in the form of software function modules. If the integrated modules are implemented in the form of software functional modules and sold or used as independent products, they may also be stored in a computer-readable storage medium.

The above-mentioned storage medium may be a read-only memory, a magnetic disk or an optical disk, and the like. Although the embodiments of the disclosure have been shown and described above, it should be understood that the above-mentioned embodiments are exemplary and should not be construed as limiting the disclosure. Embodiments are subject to variations, modifications, substitutions and variations.

What is claimed is:

1. An intelligent understanding apparatus for real-time reconstruction of a large-scale scene light field, comprising a processor configured to:
    obtain a three-dimensional (3D) instance depth map, and obtain 3D voxels and voxel color information of the 3D instance depth map through simultaneous positioning and map generation;
    construct a real-time light field reconstruction network model, and train the real-time light field reconstruction network model using a ScanNet dataset, wherein the real-time light field reconstruction network model is configured to extract features of the 3D voxels and voxel color information of the 3D instance depth map, and obtain a semantic segmentation result and an instance segmentation result of the depth map by performing semantic segmentation and instance segmentation; and
    input the 3D voxel and voxel color information corresponding to the 3D instance depth map into the trained real-time light field reconstruction network model, and determine an output as a semantic segmentation result and an instance segmentation result corresponding to the 3D instance depth map;
    wherein the real-time light field reconstruction network model comprises a sparse convolutional network and an online segmentation circuit;
    the sparse convolutional network is a UNet-like network, and the sparse convolutional network is configured to output a semantic probability and an instance embedding for each input point;
    the online segmentation circuit is configured to update a semantic category according to the semantic probability output by the sparse convolutional network, and at the same time, for each frame, obtain an instance result of a current depth map of the frame by clustering the instance embeddings obtained from the current depth map, and fuse current instance results into a global instance result;
    wherein the online segmentation circuit is further configured to:
        for semantic segmentation, update the semantic category of a current point using the semantic probability;
        for instance segmentation, cluster the instance embeddings obtained from the 3D instance depth map; and
        obtain similarities between the current instance and the global instances, obtain a mean embedding for the current instance by averaging the embeddings, and perform similarity comparison between the mean embedding and respective mean embedding of each global instance one by one.

2. The apparatus of claim 1, wherein the processor is further configured to obtain the depth map through an image sensor, wherein the image sensor is an RGB-D depth sensor, a binocular depth sensor, a structured light sensor, or a time of flight (ToF) sensor.

3. The apparatus of claim 1, wherein the sparse convolutional network is configured to set a cross entropy loss function and a discriminative loss function, wherein the cross entropy loss function is configured to train the semantic probabilities and the discriminative loss function is configured to train the instance embeddings.

4. The apparatus of claim 3, wherein the sparse convolutional network is configured to set a temporal consistency loss function, wherein the temporal consistency loss function is configured to constrain distances of an instance of a 3D instance depth map at different times to be same or near the embeddings of the instance of the same 3D instance depth map at different times.

5. The apparatus of claim 1, wherein the online segmentation circuit is further configured to:
obtain a spatial overlap ratio of the current instance, wherein the similarities between the current instance and the global instances equal to the product of the similarities between the embedding of the current instance and embeddings of the global instances and the spatial overlap ratio of the current instance, and the spatial overlap ratio information is a ratio of the number of points of the current instance that overlap with each global instance to the number of points of the current instance;
for the current instance, obtain a maximum similarity of the current instance and a corresponding global instance; and
in response to determining that the maximum similarity is less than a threshold, assign a new instance label.

6. An intelligent understanding system for real-time reconstruction of a large-scale scene light field, comprising:
an intelligent understanding apparatus; and
a memory, for storing a computer program executable by the intelligent understanding apparatus;
wherein the intelligent understanding apparatus comprises a processor configured to:
obtain a three-dimensional (3D) instance depth map, and obtain 3D voxels and voxel color information of the 3D instance depth map through simultaneous positioning and map generation;
construct a real-time light field reconstruction network model, and train the real-time light field reconstruction network model using a ScanNet dataset, wherein the real-time light field reconstruction network model is configured to extract features of the 3D voxels and voxel color information of the 3D instance depth map, and obtain a semantic segmentation result and an instance segmentation result of the depth map by performing semantic segmentation and instance segmentation; and
input the 3D voxel and voxel color information corresponding to the 3D instance depth map into the trained real-time light field reconstruction network model, and determine an output as a semantic segmentation result and an instance segmentation result corresponding to the 3D instance depth map;
wherein the real-time light field reconstruction network model comprises a sparse convolutional network and an online segmentation circuit;
the sparse convolutional network is a UNet-like network, and the sparse convolutional network is configured to output a semantic probability and an instance embedding for each input point;
the online segmentation circuit is configured to update a semantic category according to the semantic probability output by the sparse convolutional network, and at the same time, for each frame, obtain an instance result of a current depth map of the frame by clustering the instance embeddings obtained from the current depth map, and fuse current instance results into a global instance result;

wherein the online segmentation circuit is further configured to:
for semantic segmentation, update the semantic category of a current point using the semantic probability;
for instance segmentation, cluster the instance embeddings obtained from the 3D instance depth map; and
obtain similarities between the current instance and the global instances, obtain a mean embedding for the current instance by averaging the embeddings, and perform similarity comparison between the mean embedding and respective mean embedding of each global instance one by one.

7. The system of claim 6, wherein the processor is further configured to obtain the depth map through an image sensor, wherein the image sensor is an RGB-D depth sensor, a binocular depth sensor, a structured light sensor, or a time of flight (ToF) sensor.

8. The system of claim 6, wherein the sparse convolutional network is configured to set a cross entropy loss function and a discriminative loss function, wherein the cross entropy loss function is configured to train the semantic probabilities and the discriminative loss function is configured to train the instance embeddings.

9. The system of claim 8, wherein the sparse convolutional network is configured to set a temporal consistency loss function, wherein the temporal consistency loss function is configured to constrain distances of an instance of a 3D instance depth map at different times to be same or near the embeddings of the instance of the same 3D instance depth map at different times.

10. The system of claim 6, wherein the online segmentation circuit is further configured to:
obtain a spatial overlap ratio of the current instance, wherein the similarities between the current instance and the global instances equal to the product of the similarities between the embedding of the current instance and embeddings of the global instances and the spatial overlap ratio of the current instance, and the spatial overlap ratio information is a ratio of the number of points of the current instance that overlap with each global instance to the number of points of the current instance;
for the current instance, obtain a maximum similarity of the current instance and a corresponding global instance; and
in response to determining that the maximum similarity is less than a threshold, assign a new instance label.

11. An intelligent understanding method for real-time reconstruction of a large-scale scene light field, comprising:
obtaining a three-dimensional (3D) instance depth map, and obtaining 3D voxels and voxel color information of the 3D instance depth map through simultaneous positioning and map generation;
constructing a real-time light field reconstruction network model, and training the real-time light field reconstruction network model using a ScanNet dataset, wherein the real-time light field reconstruction network model is configured to extract features of the 3D voxels and voxel color information of the 3D instance depth map, and obtain a semantic segmentation result and an instance segmentation result of the depth map by performing semantic segmentation and instance segmentation; and
inputting the 3D voxel and voxel color information corresponding to the 3D instance depth map into the trained real-time light field reconstruction network model, and determining an output as a semantic segmentation result and an instance segmentation result corresponding to the 3D instance depth map;

wherein the real-time light field reconstruction network model comprises a sparse convolution network and an online segmentation circuit;

the sparse convolutional network is a UNet-like network, and the sparse convolutional network module is configured to output a semantic probability and an instance embedding for each input point;

the online segmentation circuit is configured to update a semantic category according to the semantic probability output by the sparse convolutional network module, and at the same time, for each frame, obtain an instance result of a current depth map of the frame by clustering the instance embeddings obtained from the current depth map, and fuse current instance results into a global instance result;

wherein the online segmentation circuit is further configured to:
- for semantic segmentation, update the semantic category of a current point using the semantic probability;
- for instance segmentation, cluster the instance embeddings obtained from the 3D instance depth map; and
- obtain similarities between the current instance and the global instances, obtain a mean embedding for the current instance by averaging the embeddings, and perform similarity comparison between the mean embedding and respective mean embedding of each global instance one by one.

* * * * *